United States Patent Office 3,411,593
Patented Nov. 19, 1968

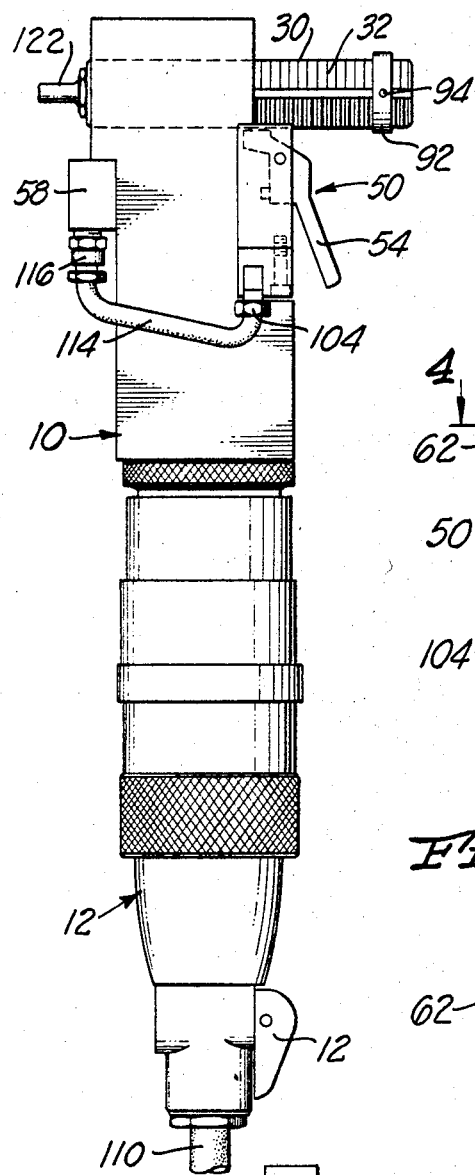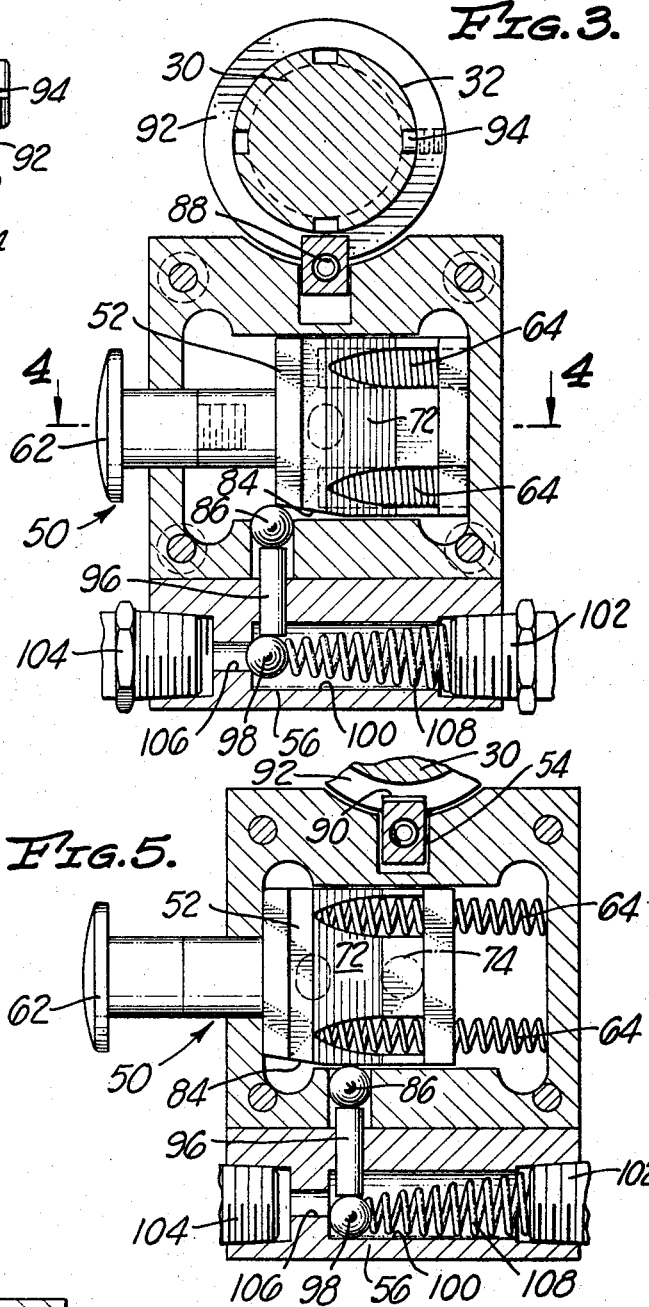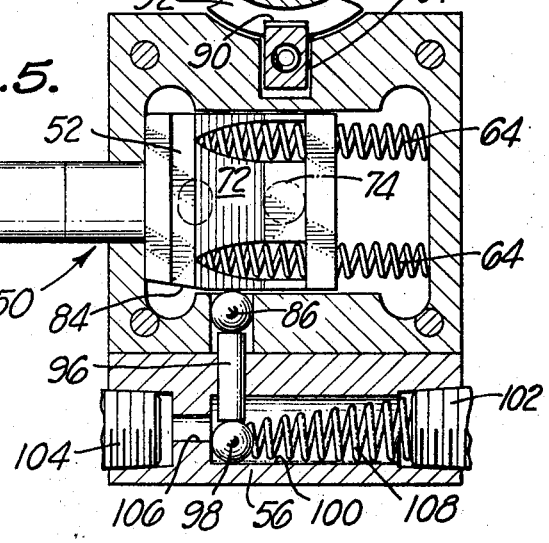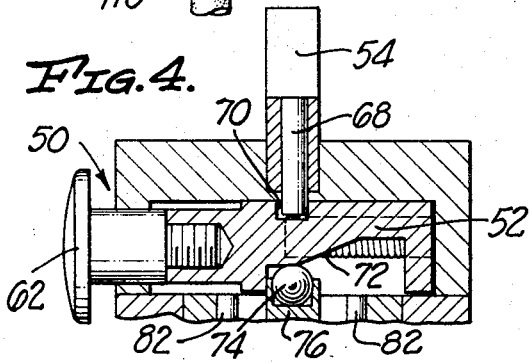

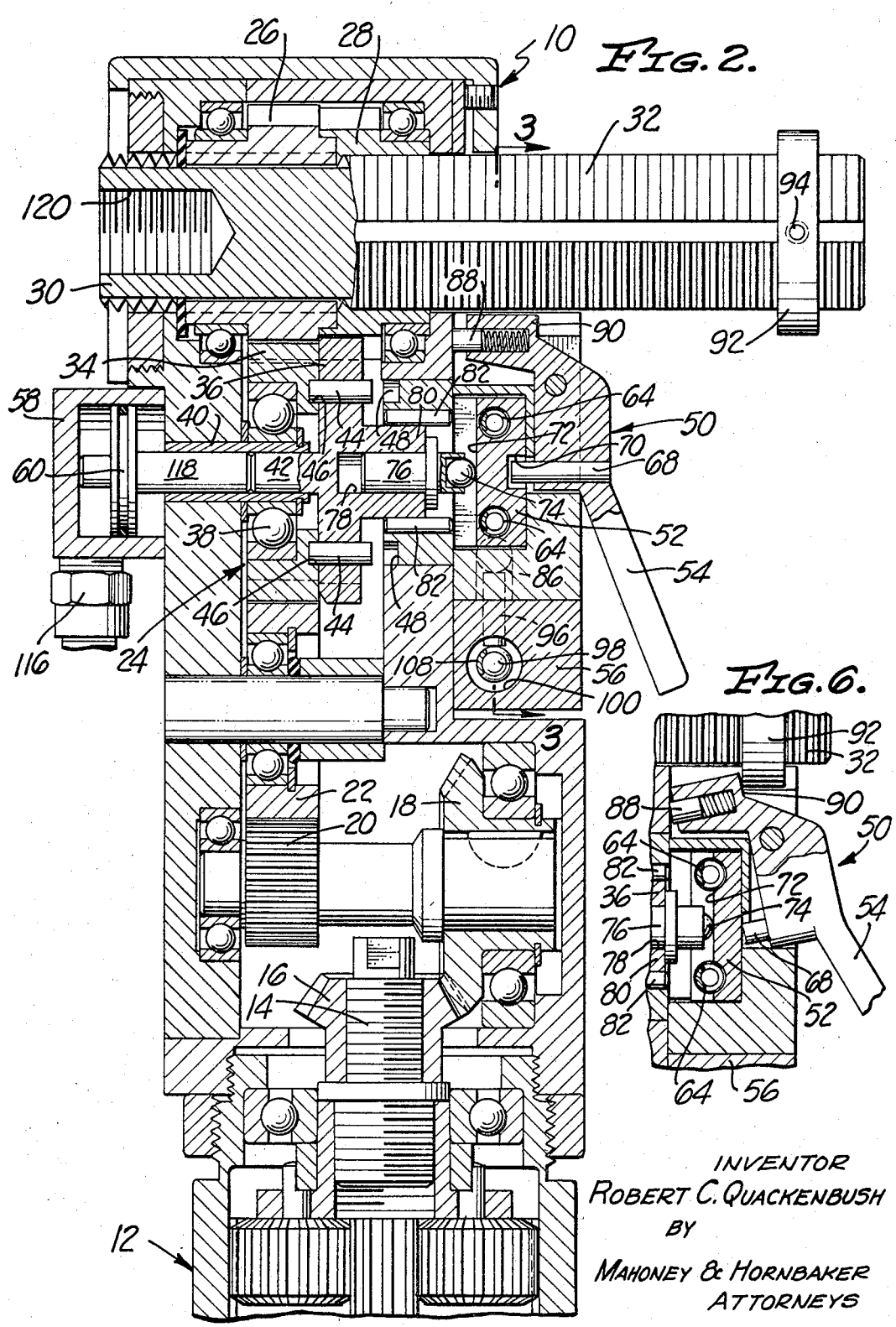

3,411,593
TOOL INCORPORATING POSITIVE
FEEDING STRUCTURE
Robert C. Quackenbush, Glendale, Calif., assignor of one-half to Arthur B. Quackenbush, Glendale, Calif.
Filed July 20, 1967, Ser. No. 654,793
15 Claims. (Cl. 173—145)

ABSTRACT OF THE DISCLOSURE

A peripherally threaded spindle mounting a working tool is rotated by a drive gear during feed and retraction strokes. A main differential gear continuously rotates said drive gear during said strokes. A feed gear is threadably engaged with the spindle periphery and is constantly engaged by an axially shiftable secondary differential gear. When the secondary differential gear is shifted to "feed," it pin connects to the main differential gear rotating the feed gear in the same direction and faster than the spindle feeding the spindle axially, and when shifted to "retract," pin engages a frame retaining a feed gear stationary and causing the rotating spindle to retract axially. Various automatic and manul means are provided for shifting the secondary differential gear.

---

This invention relates to a tool incorporating a positive feeding structure of the type wherein a rotatable spindle supports a working tool, such as a drill and the like, said spindle being axially movable during said rotation toward and away from a workpiece in tool feed and retraction strokes. According to the present invention, novel differential gear means is operably arranged with said spindle for simultaneously rotating the spindle and, by a unique interengagement and control of said differential gear means, axially moving and controlling said spindle in said feed and retraction strokes. Furthermore, there is incorporated therein means for automatically shifting the interrelation of said differential gear means at a predetermined end of the spindle feed stroke for reversing axial movement of said spindle and starting the same movable in the spindle retraction stroke.

Various prior forms of tools have been provided wherein a rotatable spindle supporting a working tool is axially movable toward and away from a workpiece in feed and retraction strokes. Many of such prior tools have incorporated a drive gear for rotating the spindle and working tool, and a feed gear for axially moving said spindle in said feed and retraction strokes. Probably the most basic problem in the prior tools of the foregoing character has been one of just exactly how to control the operation of the feed gear, and thereby the spindle movement in order to produce said spindle feed and retraction strokes without requiring a feed gear drive arrangement of prohibitive complication and size, as well as one of excessive cost.

One of the simpler basic arrangements is to provide the spindle with a threaded cylindrical periphery and threadably engage the feed gear directly with said spindle periphery. Thus, by providing relative rotation between the spindle and the feed gear in one direction, the spindle is moved in its feed stroke, and by reversing said relative rotation, said spindle is driven in its retraction stroke. Such an arrangement, however, still requires some means for controlling the rotation of the feed gear in order to produce said relative rotation with the spindle.

Certain of the prior tools have incorporated special gear trains, clutch controlled for driving engagement with the feed gear to produce the necessary relative rotation between said feed gear and the spindle and drive said spindle in its feed stroke, with said gear train being disengaged from driving said feed gear at the end of the feed stroke so that said feed gear will remain stationary relative to said spindle and thereby drive the spindle in the retraction stroke. The manner of retaining the feed gear stationary during the spindle retraction stroke has been merely the connection of the feed gear to the clutch arrangement so that once the clutch has been disengaged for beginning the spindle retraction stroke, the remaining gears connected with the feed gear supply sufficient interference so that the feed gear will remain stationary unless deliberately driven through said clutch arrangement. In other words, the gear connection of the feed gear to the particular clutch arrangement is relatively high energy absorbing, necessarily so if said gear connection is to retain the feed gear stationary during rotation of the spindle relative thereto in the retraction stroke.

Furthermore, with such prior clutch controlled arrangement, an adjustable collar has been positioned on the spindle functioning to define the end of the feed stroke and stalling or stopping rotation of the spindle until the clutch arrangement can be switched for commencing the retraction stroke. By providing the overall drive means for driving the various gears to both rotate the spindle and move said spindle in the feed and retraction strokes of a stallable fluid drive means, it is possible to arrange the collar on the spindle in a position to merely jam against the housing of the construction when the spindle has reached the end of a predetermined feed movement, thereby retaining the spindle stationary until an operator switches the clutch arrangement for the commencement of the retraction stroke. It is, therefore, necessary for the operator to engage the clutch arrangement at the beginning of the spindle feed stroke, then wait until the spindle has jammed and stopped at the end of the feed stroke, and then switch the clutch arrangement for disconnection thereof to start and complete the spindle retraction stroke.

Such prior clutch controlled feed gear arrangement has not been entirely satisfactory. The retainment of the feed gear stationary through the relatively high energy absorbing gear arrangement during the spindle retraction stroke can not only lose a certain amount of its energy absorbing nature through wear over a period of use so as to permit a certain amount of rotation of the feed gear and slow down the spindle retraction stroke, but also, such gear arrangement requires a greater driving force during the spindle feed stroke. Furthermore, in order to increase production speed, it is desirable to eliminate the attention of the operator for switching the clutch arrangement to begin the retraction stroke. In other words, a great amount of production time can be gained by having the spindle movable in a prearranged feed stroke and then automatically reversible for movement in the retraction stroke without requiring the operator to deliberately switch between said feed and retraction strokes.

It is, therefore, an object of my invention to provide a tool incorporating a positive feeding structure of the type having a rotating spindle movable through feed and retraction strokes for rotatably mounting a working tool movable toward and away from a workpiece wherein unique differential gear means is provided for not only positively rotating said spindle through a drive gear, but also positively moving said spindle in said feed and retraction strokes through a feed gear. According to the present invention, said differential gear means is arranged shiftable between a feeding position and a retracting position, in said feeding position positively rotating both the drive and feed gears to move the spindle in the feed stroke, and in said retracting position continuing to rotate said drive gear while positively retaining said feed gear stationary to move said spindle in the retraction stroke. The shifting of said differential gear means is accomplished automatically through a direct engagement between means on the spindle and means operably associated with said differential gear means, eliminating the necessity of an operator switching between said feed and retraction strokes.

It is a further object of my invention to provide a tool incorporating a positive feeding structure of the foregoing character wherein said unique differential gear means preferably includes a primary differential gear directly engaged rotating said drive gear and a secondary differential gear shiftable between a feeding position directly engaged between said primary differential gear and said feed gear and a retracting position directly engaged between the tool housing and said feed gear. As a result, both said drive and feed gears are rotated directly by said primary differential gear during the spindle feed stroke. Also, said drive gear is directly rotated by said primary differential gear and said feed gear is retained stationary by said housing during the spindle retraction stroke.

It is another object of my invention to provide a tool incorporating a positive feeding structure of the foregoing character wherein positioning means is provided for said unique differential gear means for retaining said differential gear means in the feeding position during the spindle feed stroke and being automatically actuated by engagement of means on the spindle for shifting said differential gear means to the retracting position. The means on the spindle may be the relatively conventional adjustable collar, but said collar co-operates with said positioning means in a completely unique manner so as to accomplish said shifting of said differential gear means without the necessity of jamming the spindle against rotation at the end and between the spindle feed and retraction strokes. The movement of the spindle from the feed into the retraction stroke thereof, therefore, takes place in a smooth and efficient manner.

It is also an object of my invention to provide a tool incorporating a positive feeding structure of the foregoing character which provides a gearing system greatly simplified over anything heretofore provided in tools of a similar nature. Said gearing accomplishes the rotation of the drive gear, and the rotation or stationary retainment of the feed gear for carrying out the spindle feed and retraction strokes without the necessity of any deliberate power loss. Furthermore, the rotation of the feed gear and the retainment thereof stationary during the respective spindle feed and retraction strokes is completely positive so that the speed of said strokes will always be the same as originally predetermined and wear will not be a factor as to the determined speed thereof.

Other objects and advantages of the invention will be apparent from the following specification and the accompanying drawings which are for the purpose of illustration only, and in which:

FIG. 1 is a side elevational view showing an embodiment of a tool incorporating the principles of the present invention, with the spindle in a retracted position and the positioning means for the differential gear means in feeding position for moving said spindle in the feed stroke thereof;

FIG. 2 is an enlarged, fragmentary, vertical, sectional view of the tool of FIG. 1, with the components thereof positioned as in FIG. 1;

FIG. 3 is a fragmentary, sectional view taken along the broken line 3—3 in FIG. 2 and showing the various components in the feeding position of FIG. 2;

FIG. 4 is a fragmentary, sectional view taken along the broken line 4—4 in FIG. 3 and showing the various components in the position of FIG. 2;

FIG. 5 is a fragmentary, sectional view similar to FIG. 3, but showing the various components shifted to the retracting position for moving the spindle in the retraction stroke; and FIG. 6 is a fragmentary, sectional view taken from FIG. 2 and showing the various components after completion of the spindle feed stroke and just commencing the spindle retraction stroke.

Referring to the drawings, the illustrated embodiment incorporating the principles of the present invention includes a housing, generally indicated at 10, mounting a fluid-driven drive motor, generally indicated at 12, said drive motor preferably being driven by air and having a drive shaft 14 for rotating a series of somewhat conventional, operably connected gears 16, 18, 20 and 22. Gears 16 through 22 merely serve to transmit rotational power from the drive motor 12 to differential gear means, generally indicated at 24, said differential gear means operably controlling a spindle drive gear 26 and a spindle feed gear 28 arranged for moving a spindle 30 in feed and retraction strokes relative to the housing 10 while constantly rotating said spindle. Both the drive and feed gears 26 and 28 are telescoped over the spindle 30, said drive gear being spline connected to the spindle for constantly rotating said spindle while permitting axial spindle movement in said strokes, and said feed gear being threadably engaged with a spindle threaded outer periphery 32 for threadably moving said spindle in said strokes during said constant rotation.

As best seen in FIG. 2, the differential gear means 24 includes a main or primary differential gear 34 and a secondary differential gear 36, the primary differential gear being rotatably mounted in the housing 10 through a ball bearing 38 secured to a central hollow bushing 40, said bushing axially receiving an axially extending, mounting portion 42 of the secondary differential gear rotatable and axially shiftable relative thereto. The primary differential gear 34 is axially stationary relative to the housing 10 and is in constant driving connection between the gear 22 and the spindle drive gear 26. The secondary differential gear 36 is positioned axially adjacent the primary differential gear 34 in constant engagement with the spindle feed gear 28 and is axially shiftable from a feeding position abutting the primary differential gear and a retracting position spaced from the primary differential gear and abutting the housing 10 internally thereof.

When the secondary differential gear 36 is in the feeding position abutting the primary differential gear 34, a series of drive pins 44 are axially received in drive openings 46 of the primary differential gear, thereby connecting the secondary differential gear for rotative drive by the primary differential gear. When the secondary differential gear 36 is shifted axially away from the primary differential gear into its retracting position, said drive pins 44 disengage from the primary differential gear and oppositely axially engage in engagement openings 48 of the housing 10 so as to retain the secondary differential gear stationary with the housing. In the feeding position of the secondary differential gear 36, therefore, the secondary differential gear will rotatably drive the spindle feed gear directly from the primary differential gear 34 and while said primary differential gear is constantly rotating the spindle 30, whereas in the secondary differential gear retracting position, said secondary differential gear will retain the feed gear stationary while the primary differential gear continues to constantly rotate said spindle.

It will be noted that the secondary differential gear 36 is slightly larger than the primary differential gear 34, with the spindle drive and feed gears 26 and 28 being appropriately sized so that during rotation of the feed gear 28 by the secondary differential gear 36, even though through the primary differential gear 34, the feed gear will rotate slightly faster than the spindle 30 so as to move said spindle axially relative to the housing 10 in the feed stroke thereof. When, however, the secondary differential gear 36 is shifted to its retracting position retained stationary by the housing 10, the continued rotation of the spindle 30 by the drive gear 26 will move the spindle in the opposite axial direction relative to the housing in the retraction stroke, said retraction stroke being relatively fast.

The axial shifting of the secondary differential gear 36 is controlled by positioning means, generally indicated at 50, the internal details of which are best seen in FIGS. 2 through 6. Said positioning 50 means includes a slidable cam block 52, a pivotal control lever 54, a cam controlled fluid valve 56 and a fluid cylinder 58 having a piston 60.

The cam block 52 is received within the housing 10 transversely slidable relative thereto and is connected through said housing to a manual control knob 62, as best seen in FIGS. 3 through 5. Furthermore, the cam block 52 is normally resiliently urged transversely slidably to the left into a nonblocking position, as shown in FIG. 5, by a pair of compression springs 64, but is transversely slidable manually to the right into a blocking position through the control knob 62, as shown in FIGS. 3 and 4. Cam block 52 is releasably locked in the blocking position when manually slid thereto and against the resilient urging of the compression springs 64 by the engagement of a locking pin 68 on the pivotal control lever 54 received in a cam block opening 70, as seen in FIGS. 2 and 4.

The cam block 52 is also formed with a gear control cam surface 72, also best seen in FIGS. 2 and 4, engaged by an abutting cam follower ball 74 of a cam follower 76. The cam follower 76 is axially shoulder engaged with the secondary differential gear 36, being axially received in a cam follower opening 78 formed in a mounting portion 80 of said secondary differential gear. The mounting portion 80 of the secondary differential gear 36, similar to the previously described mounting portion 42 of said gear, is rotatably and axially slidably mounted in the housing 10 through a needle bearing 82.

Still further, the cam block 52 is formed with a valve control cam surface 84 facing the fluid valve 56 engaged with a valve control ball 86 forming a part of said fluid valve, as best seen in FIGS. 3 and 5. The operation of the gear control cam surface 72 and the valve control cam surface 84 of the cam block 52 will be hereinafter explained more in detail. For the moment, it is sufficient to state that the gear control cam surface 72 serves to partially control the shifting of the secondary differential gear 36 between the feeding and retracting positions previously described, and the valve control cam surface 84 controls the opening and closing of the fluid valve 56.

As best seen in FIGS. 1, 2, 4 and 6, the pivotal control lever 54 in addition to the previously described locking pin 68 is formed with an end spring-urged plunger 88 normally resiliently urging said control lever to pivot clockwise for engagement of the locking pin with the cam block opening 70, as shown in FIG. 2, but permitting counterclockwise pivoting of said control lever for disengagement of said locking pin from the cam block 52, as shown in FIG. 6. Also, the control lever 54 is formed with the end engagement shoulder 90 aligned for engagement by a reversing collar 92 on the spindle 30. The reversing collar 92 is axially adjustable into selected preset positions along the spindle 30 by a set screw 94 in usual manner.

The fluid valve 56 in addition to the previously described valve control ball 86 and as best seen in FIGS. 3 and 5, includes a valve control rod 96 axially slidably received in the housing 10 abutting said valve control ball, with the opposite end of the valve control rod abutting a valve shutoff ball 98 positioned within a valve chamber 100 formed in said housing. Valve 56 further includes a fluid inlet connection 102 and a fluid outlet connection 104, the latter communicating into the valve chamber 100 through a fluid outlet orifice 106. A conically formed compression spring 108 is positioned within the valve chamber 100 normally urging the valve shutoff ball 98 into a position closing the fluid outlet orifice 106, but permitting movement of said ball away from closing said outlet orifice when so urged by the valve control rod 96, although always tending to return said ball to said orifice closing position.

The main fluid supply, preferably in the form of air, is directed to the entire tool through a main fluid supply line 110 and through a main fluid control valve 112, as shown in FIG. 1. A portion of said fluid supply forward of the main fluid control valve 112 is directed to the fluid inlet connection 102 of the just described fluid valve 56. The fluid outlet connection 104 of said fluid valve 56 is connected through an auxiliary fluid supply line 114 to fluid inlet connection 116 of the fluid cylinder 58.

The fluid cylinder 58, as previously stated, includes the piston 60, as seen in FIG. 2, said piston having a piston rod 118 axially slidably received in the opposite end of the bushing 40 from the mounting portion 42 of the secondary differential gear 36. As shown, the bushing 40 opens through the housing 10 axially between the piston 60 and the secondary differential gear 36 so that the piston rod 118 may axially abut the mounting portion 42 of the secondary differential gear. Again, the purpose and operation of the fluid cylinder 58 will be hereinafter described in detail.

As seen in FIGS. 1 and 2, the spindle 30 at the end thereof opposite the reversing collar 92 includes a threaded socket 120 for threadably mounting a working tool, in this case, in the form of a drill 122. Thus, the rotation of the spindle 30 will rotate the drill 122 and the spindle feed and retraction strokes will move said drill toward and away from a workpiece (not shown) and relative to the housing 10.

In operation of the tool described in the foregoing, the air to the drive motor 12 is turned on and regulated by the main fluid control valve 112 commencing rotation of the primary differential gear 34 and through said gear, the drive gear 26 so as to rotate the spindle 30. Pushing in of the control knob 62 to the position shown in FIGS. 3 and 4 slides the cam block 52 to its blocking position, causing the gear control cam surface 72 to force the cam follower 76 to the left, as shown in FIG. 2, and thereby force the secondary differential gear 36 axially against the primary differential gear 34, establishing driving connection therebetween by the engagement of the drive pins 44 in the drive opening 46. The secondary differential gear 36, is therefore, rotated directly from the primary differential gear 34 and in turn rotates the feed gear 28 to begin axial movement of the spindle 30 in the spindle feed stroke.

Sliding of the cam block 52 to its blocking position also aligns the cam block opening 70 with the control lever lock pin 68 so that said locking pin is received in said cam block opening, permitting the control lever 54 to pivot clockwise to the position shown in FIG. 2 and lock the cam block in said blocking position. Still further, with the cam block 52 in said blocking position, the valve control cam surface 84 of said cam block relieves the valve control ball 86 and valve control rod 96 so that the valve shutoff ball 98 is urged by the conical spring 108 to close the valve fluid outlet orifice 106 in the position shown in FIG. 3. The closing of the fluid valve 56 cuts off any air flow to the fluid cylinder 58 so that no air is directed against the piston 60 and said piston is permitted to slide to the left, as viewed in FIG. 2, during the shifting of the secondary differential gear 36 into engagement with the primary differential gear 34, as previously described.

The spindle 30 continues its axial movement in the feed stroke, to the left as viewed in FIG. 2 and relative to the housing 10, until the reversing collar 92 contacts the engagement shoulder 90 of the control lever 54, pivoting said control lever counterclockwise to the position shown in FIG. 6 and withdrawing the locking pin 68 from the cam block 52. Upon the release of the cam block 52, the compression springs 64 will urge said cam block from the blocking position shown in FIG. 3 to the nonblocking position shown in FIG. 5, thereby relieving the axial pressure on the cam follower 76 engaged with the secondary differential gear 36, and at the same time, exerting pressure on the valve control ball 86 and the valve control rod 96 to force the valve shutoff ball 98 to open the fluid outlet orifice 106, permitting air flow through the fluid valve 56 to the fluid cylinder 58. Air flow into the fluid cylinder 58 forces the piston 60 to the right, as viewed in FIG. 2, and since the cam follower 76 has been relieved by the cam block 52, said piston will force the secondary differential gear 36 out of engagement with the primary differential gear 34 and into stationary engagement with the housing 10 so that said secondary differential gear 36 is retained stationary by the housing and will in turn retain the feed gear 28 stationary, commencing the retraction stroke of the spindle 30, to the right, as viewed in FIG. 2.

The spindle 30 will continue in the retraction stroke until the air supply to the tool is cut off at the main fluid control valve 112, or by means of an auxiliary cutoff control knob exterior of the tool (not shown), or until the control knob 62 is again manually forced inwardly from the position shown in FIG. 5 to the position shown in FIGS. 3 and 4, which would again commence a feed stroke of the spindle, as previously described. Thus, the tool can be stopped between working operations, or can be immediately started in another feed stroke at any time during the retraction stroke thereof.

I have provided, therefore, according to the principles of the present invention, a tool incorporating a positive feeding structure wherein said feeding structure incorporates a unique form of differential gear means 24 which positively controls operation of said tool in the feed stroke, reversing to the retraction stroke and in the retraction stroke. Furthermore, said differential gear means 24 is arranged with unique positioning means 50 wherein the feed gear 28 for moving the spindle 30 in its feed and retraction strokes is driven directly with the drive gear 26 during said feed stroke and is retained stationary by positive engagement with the housing 10 during the spindle retraction stroke, thereby positively controlling said spindle feed and retraction movement in a manner not heretofore possible in tools of similar character. Also, through the provision in the differential gear means 24 of the primary differential gear 34 directly driving the secondary differential gear 36 during direct driving of the feed gear 28 for the spindle feed stroke, the gear driving of the tool of the present invention is greatly simplified over the prior tools.

I claim:

1. In a tool incorporating a positive feeding structure, the combination of: a housing; a spindle on said housing having tool mounting means thereon for positioning a working tool rotatable therewith; rotatable drive gear means operably associated with said spindle for rotating said spindle while permitting axial movement of said spindle relative thereto in feed and retraction strokes; rotatable feed gear means operably associated with said spindle for moving said spindle in said feed stroke when said feed gear means is rotated faster than said spindle and for moving said spindle in said retraction stroke when said feed gear means is retained stationary relative to said spindle during said spindle rotation; differential gear means operably connected to said drive and feed gear means shiftable into a feeding position for continuously rotating said drive gear means while rotating said feed gear means faster than said spindle rotation and shiftable into a retracting position for continuously rotating said drive gear means while retaining said feed gear means stationary relative to said spindle; and automatically actuated positioning means engageable directly between said spindle and differential gear means at the end of said spindle feed stroke for shifting said differential gear means from said feeding to said retracting position.

2. A tool as defined in claim 1 in which there is selectively operable manual positioning means operably associated with said differential gear means for shifting said differential gear means from said retracting to said feeding position during said spindle retraction stroke.

3. A tool as defined in claim 1 in which said automatically actuated positioning means includes means blocking said differential gear means in said feeding position and releasable from said blocking by direct engagement of said spindle, means actuated by said release of said blocking means for shifting said differential gear means from said feeding to said retracting position.

4. A tool as defined in claim 1 in which said automatically actuated positioning means includes slidable blocking means movable between a blocking position retaining said differential gear means in said feeding position and a nonblocking position releasing said differential gear means for movement from said feeding to said retracting position, said blocking means normally being resiliently urged to nonblocking position, detent means movable between a position engaged with said blocking means when said blocking means is in blocking position and a position released from engagement with said blocking means, said detent means normally being resiliently urged to said position engaged with said blocking means, means on said spindle engageable with said detent means at said end of said spindle feed stroke for moving said detent means to said position disengaged from said blocking means, means actuated by said sliding of said blocking means to said nonblocking position for shifting said differential gear means from said feeding to said retracting position.

5. A tool as defined in claim 1 in which said automatically actuated positioning means includes blocking means slidable between a blocking position retaining said differential gear means in said feeding position and a nonblocking position releasing said differential gear means for shifting from said feeding to said retracting position, said blocking means normally being resiliently urged to said nonblocking position, detent means pivotal between a position engaged with said blocking means when said blocking means is in said blocking position and a position disengaged from said blocking means releasing said blocking means for said slidable movement from said blocking to said nonblocking position, said detent means normally being resiliently urged to said position engaging said blocking means, collar means on said spindle for engaging and pivoting said detent means from said detent means engaged to disengaged position at said end of said spindle feed stroke, means actuated by said sliding of said blocking means from said blocking to said nonblocking position for shifting said differential gear means from said feeding to said retracting position.

6. A tool as defined in claim 1 in which selectively operable manual positioning means is operably associated with said differential gear means for shifting said differential gear means from said retracting to said feeding position during said spindle retraction stroke; and in which said automatically actuated positioning means includes means blocking said differential gear means in said feeding position and releasable by said engagement of said spindle at said end of said spindle feed stroke for movement from said blocking of said differential gear means, means actuated by said movement of said blocking means from blocking said differential gear means for shifting said differential gear means from said feeding to said retracting position.

7. A tool as defined in claim 1 in which said automatically actuated positioning means includes blocking means slidable between a blocking position retaining said differential gear means in said feeding position and a nonblocking position releasing said differential gear means for said shifting from said feeding to said retracting position, said blocking means normally being resiliently urged to said nonblocking position, detent means movable between a position engaged with said blocking means when said blocking means is in said blocking position and a position releasing said blocking means for movement of said blocking means from said blocking to said nonblocking position, said detent means normally being resiliently urged to said blocking means engaging position, collar means on said spindle engageable with said detent means at said end of said spindle feed stroke for moving said detent means from said blocking means engaged to said disengaged position, fluid cylinder means actuated by said movement of said blocking means from said blocking to said nonblocking position for shifting said differential gear means from said feeding to said retracting position and retaining said differential gear means in said retracting position during said spindle retraction stroke; and in which selectively operable manual positioning means is operably associated with said differential gear means for shifting said differential gear means from said retracting to said feeding position during said spindle retraction stroke, means operably associated with said manual positioning means for terminating actuation of said fluid cylinder means upon selective operation of said manual positioning means.

8. In a tool incorporating a positive feeding structure, the combination of: a housing; a spindle on said housing having tool mounting means thereon for positioning a working tool rotatable therewith, said spindle having a threaded cylindrical periphery; rotatable drive gear means operably connected to said spindle for rotating said spindle on said housing while permitting axial spindle movement relative thereto in a feed stroke and a reverse retraction stroke; rotatable feed gear means threadably engaged with said spindle periphery for axially moving said spindle in said feed and retraction strokes upon relative rotation therebetween; driving means for rotating said drive and feed gear means including a main differential gear engaged with and continuously rotating said drive gear means during said spindle strokes, a secondary differential gear engaged with and controlling rotation of said feed gear means, means mounting said secondary differential gear shiftable between a feeding position operably engaged with and rotated by said main differential gear and a retracting position operably engaged with and retained stationary by said housing, said secondary differential gear rotating said feed gear means faster than said spindle rotation when in said feeding position to move said spindle in said feed stroke, said secondary differential gear retaining said feed gear means stationary when in said retracting position to move said spindle in said retraction stroke; and automatic positioning means operably associated between said spindle and secondary differential gear automatically operable at the end of said spindle feed stroke for shifting said secondary differential gear from said feeding to said retracting position.

9. A tool as defiend in claim 8 in which said means mounting said secondary differential gear shiftable and engageable includes pin means engageable directly between said secondary and main differential gears when said secondary differential gear is in said feeding position and directly engageable between said secondary differential gear and said housing when said secondary differential gear is in said retracting position.

10. A tool as defined in claim 8 in which selectively operable manual positioning means is operably associated with said secondary differential gear for shifting said secondary differential gear from said retracting to said feeding position during said spindle retraction stroke.

11. A tool as defined in claim 8 in which said automatic positioning means includes means blocking said secondary differential gear in said feeding stroke and releasable for permitting movement of said secondary differential gear from said feeding to said retracting position, means on said spindle for releasing said blocking means at said end of said spindle feed stroke, means actuated by said release of said blocking means for shifting said secondary differential gear from said feeding to said retracting position.

12. A tool as defined in claim 8 in which said automatic positioning means includes blocking means slidably movable between a blocking position retaining said secondary differential gear in said feeding position and a nonblocking position releasing said secondary differential gear for shifting from said feeding to said retracting position, said blocking means normally being resiliently urged to said nonblocking position, detent means movable between a position engaged with said blocking means when said blocking means is in said blocking position and a position disengaged from said blocking means permitting said blocking means sliding from said blocking to said nonblocking position, said detent means normally being resiliently urged into said blocking means engaging position, means on said spindle engageable with said detent means at said end of said spindle feed stroke for moving said detent means from said position engaged with said blocking means and said position releasing said blocking means, means actuated by said sliding of said blocking means from said blocking to said nonblocking position for shifting said secondary differential gear from said feeding to said retracting position.

13. A tool as defined in claim 8 in which said automatic positioning means includes blocking means sildably movable between a blocking position retaining said secondary differential gear in said feeding position and a nonblocking position releasing said secondary differential gear for shifting from sad feeding to said retracting position, said blocking means normally being resiliently urged to said nonblocking position, detent means movable between a position engaged with said blocking means when said blocking means is in said blocking position and a position disengaged from said blocking means permitting said blocking means sliding from said blocking to said nonblocking position, said detent means normally being resiliently urged into said blocking means engaging position, collar means on said spindle engageable with said detent means at said end of said spindle feed stroke for moving said detent means from said position engaged with said blocking means to said position releasing said blocking means, fluid cylinder means actionable by said sliding of said blocking means from said blocking to said nonblocking position for shifting said secondary differential gear from said feeding to said retracting position, said fluid cylinder means during actuation thereof retaining said secondary differential gear in said retracting position; and in which selectively operable manual positioning means is operably associated with said blocking means for sliding said blocking means from said nonblocking to said blocking position upon selective operation of said manual positioning means during said spindle retraction stroke, said sliding of said blocking means from said retracting to said feeding position deactuating said fluid cylinder means.

14. A tool as defined in claim 8 in which said automatic positioning means includes blocking means slidably movable between a blocking position retaining said secondary differential gear in said feeding position and a nonblocking position releasing said secondary differential gear for shifting from said feeding to said retracting position, said blocking means normally being resiliently urged to said nonblocking position, detent means movable between a position engaged with said blocking means when said blocking means is in said blocking position and a position disengaged from said blocking means permitting said blocking means sliding from said blocking to said nonblocking position, said detent means normally being resiliently urged into said blocking means engaging position, means on said spindle engageable with said detent means at said end of said spindle feed stroke for moving said detent means from said position engaged with said blocking means and said position releasing said blocking means, means actuated by said sliding of said blocking means from said blocking to said nonblocking position for shifting said secondary differential gear from said feeding to said retracting position; and in which said means mounting said secondary differential gear shiftable and engageable includes pin means engageable directly between said secondary and main differential gears when said secondary differential gear is in said feeding position and directly engageable between said secondary differential gear and said housing when said secondary differential gear is in said retracting position.

15. A tool as defined in claim 8 in which said means mounting said secondary differential gear shiftable and engageable includes means positioning said secondary differential gear axially aligned with said main differential gear, said secondary differential gear being axially shiftable relative to said main differential gear, said secondary differential gear being axially shifted adjacent said main differential gear in said feeding position and away from said main differential gear in said retracting position, pin means projecting axially from said secondary differential gear engageable with said main differential gear in said feeding position of said secondary differential gear and engageable with said housing in said retracting position of said secondary differential gear.

References Cited

UNITED STATES PATENTS

| 1,903,648 | 4/1933 | Holmes | 74—841 |
| 1,909,830 | 5/1933 | Jeffrey | 74—841 |
| 1,954,050 | 4/1934 | Moon | 74—841 |
| 2,030,636 | 2/1936 | Jeffrey | 74—841 |
| 2,353,006 | 7/1944 | Beltz | 173—145 X |
| 3,072,203 | 1/1963 | Bendixen | 173—145 |

NILE C. BYERS, JR. *Primary Examiner.*